US010492208B2

United States Patent
Petersson et al.

(10) Patent No.: US 10,492,208 B2
(45) Date of Patent: Nov. 26, 2019

(54) METHOD OF SCHEDULING COMMUNICATIONS DEVICES IN A COMMUNICATIONS SYSTEM

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/573,729

(22) PCT Filed: Oct. 30, 2017

(86) PCT No.: PCT/EP2017/077783
§ 371 (c)(1),
(2) Date: Nov. 13, 2017

(87) PCT Pub. No.: WO2019/086100
PCT Pub. Date: May 9, 2019

(65) Prior Publication Data
US 2019/0132852 A1    May 2, 2019

(51) Int. Cl.
*H04W 72/12*    (2009.01)
*H04W 72/04*    (2009.01)
(Continued)

(52) U.S. Cl.
CPC .......... *H04W 72/12* (2013.01); *H04B 7/0617* (2013.01); *H04B 7/0634* (2013.01); *H04W 16/28* (2013.01); *H04W 72/046* (2013.01)

(58) Field of Classification Search
CPC ... H04W 72/12; H04W 72/046; H04W 16/28; H04W 72/044; H04W 72/048;
(Continued)

(56) References Cited

U.S. PATENT DOCUMENTS

| 5,649,287 A | 7/1997 | Forssén et al. |
| 2008/0144737 A1* | 6/2008 | Naguib .................. H04B 7/063 375/299 |

(Continued)

FOREIGN PATENT DOCUMENTS

| WO | 2017/026009 A1 | 2/2017 |
| WO | 2017/058286 A1 | 4/2017 |

OTHER PUBLICATIONS

International Search Report and Written Opinion dated Jul. 5, 2018 issued in International Patent Application No. PCT/EP2017/077783. (17 pages).

*Primary Examiner* — Paul H Masur
*Assistant Examiner* — Michael K Phillips
(74) *Attorney, Agent, or Firm* — Rothwell, Figg, Ernst & Manbeck, P.C.

(57) ABSTRACT

A method (20) of scheduling communications devices (3a, 3b, 3c) in a communications system (1) is disclosed. The method (20) is performed in a network node (2) arranged to serve a number of communications devices (3a, 3b, 3c) by using an analog beamformer and comprises: identifying (21) two or more of the communications devices (3a, 3b, 3c) as candidates for co-scheduling, determining (22) complex antenna weights for one or more beams B1 based on transmission beam reports received from each of the two or more identified communications devices (3a, 3b, 3c), and co-scheduling (23) the two or more of the communications devices (3a, 3b, 3c) simultaneously using the one or more determined beams B1, wherein the number of determined beams is less than the number of communications devices (3a, 3b, 3c). A corresponding network node (2), computer program and computer program products are provided.

22 Claims, 3 Drawing Sheets

(51) Int. Cl.
*H04W 16/28* (2009.01)
*H04B 7/06* (2006.01)

(58) Field of Classification Search
CPC . H04W 72/0493; H04W 72/06; H04W 72/08; H04W 24/10; H04W 72/121; H04B 7/0634; H04B 7/0617; H04B 7/086; H04B 7/0695; H04B 7/0621; H04B 7/0636; H04B 7/0408; H04B 7/0417
See application file for complete search history.

(56) References Cited

U.S. PATENT DOCUMENTS

| | | | |
|---|---|---|---|
| 2014/0016573 A1* | 1/2014 | Nuggehalli | H01Q 1/242 370/329 |
| 2016/0072570 A1* | 3/2016 | Kimura | H04B 7/0617 370/329 |
| 2016/0142117 A1* | 5/2016 | Rahman | H04B 7/0469 375/267 |
| 2017/0111886 A1* | 4/2017 | Kim | H04W 72/042 |
| 2017/0207843 A1* | 7/2017 | Jung | H04B 7/0408 |
| 2018/0115447 A1 | 4/2018 | Hasegawa et al. | |
| 2018/0270844 A1* | 9/2018 | Kim | H04B 7/04 |
| 2018/0287748 A1* | 10/2018 | Kim | H04W 80/02 |

* cited by examiner

METHOD OF SCHEDULING COMMUNICATIONS DEVICES IN A COMMUNICATIONS SYSTEM

CROSS REFERENCE TO RELATED APPLICATION(S)

This application is a 35 U.S.C. § 371 National Stage of International Patent Application No. PCT/EP2017/077783, filed Oct. 30, 2017, designating the United States, the disclosure of which is incorporated by reference.

TECHNICAL FIELD

The technology disclosed herein relates generally to the field of antenna technology, and in particular to a method of scheduling communications devices in a communications system, and corresponding network node, computer program and computer program product.

BACKGROUND

For narrow beams at higher frequencies transmission and reception schemes will be needed in order to compensate for high propagation losses that will occur. A suitable Transmission Reception Point (TRP) transmission (TX) beam for each user equipment (UE) is expected to be discovered and monitored by a communications system using measurements on downlink reference signals used for beam management. The CSI-RS (channel state information-reference signal) is the reference signal that has been agreed on in $3^{rd}$ Generation Partnership Project (3GPP) as beam reference signal for New Radio (NR). The CSI-RS for beam management can be transmitted periodically, semi-persistently or aperiodically (event triggered) and it can either be shared between multiple UEs or be UE-specific. In order to find a suitable TRP beam the TRP transmits CSI-RSs in different TRP TX beams on which the UE performs Reference Signal Received Power (RSRP) measurements. The UE reports back the N best TRP TX beams, where N can be configured by the communications system.

There are basically three different implementations of beamforming at the TRP: analog beamforming, digital beamforming and hybrid beamforming. Each implementation has its advantages and disadvantages. Digital beamforming is the most flexible solution but also the most expensive due to the large number of radios and baseband chains that are required. Analog beamforming is the least flexible but also less expensive to manufacture owing to a reduced number of radio and baseband chains compared to the digital solution. Hybrid beamforming is a compromise between the analog and digital beamforming. The concept of antenna panels is one type of beamforming antenna architecture at the TRP that is to be studied in 3GPP for the NR access technology. An antenna panel is an antenna array of single- or dual-polarized elements with typically one transmit/receive unit (TXRU) per polarization. An analog distribution network with phase shifters is used to steer the beam of each panel.

In today's communications systems, the traffic profile is such that a majority of data sessions are very short. However, there is still a significant part of the traffic that comprises longer data sessions, such as, for instance, streaming of music, videos and voice calls etc. and the capacity demand in the communications system may then be high. One drawback with the analog beamforming implementation is that the TRP can only transmit or receive in one beam at a time, if assuming one panel and the same beam for both polarizations, which is typically the case in order to counteract dropped signal strength due to polarization mismatching. Further, the TRP antennas (e.g. a panel) for this implementation can only transmit with one beam at each time instant. If the beams are narrow, this reduces the possibility to serve multiple UEs simultaneously since it is unlikely that two UEs that have data in their buffers will be within the same beam. There may thus be a lack of capacity in the communications system, and an increased latency, both of which decrease user satisfaction.

SUMMARY

An objective of the present disclosure is to provide an efficient beamforming. A particular objective is to enable a capacity increase in a communications system. Another particular objective is to enable reduced latency in a communications system. These objectives and others are achieved by the method, network node, computer program and computer program product according to the appended independent claims, and by the embodiments according to the dependent claims.

The objective is according to an aspect achieved by a method of scheduling communications devices in a communications system. The method is performed in a network node arranged to serve a number of communications devices by using an analog beamformer. The method comprises identifying two or more of the communications devices as candidates for co-scheduling, determining complex antenna weights for one or more beams based on transmission beam reports received from each of the two or more identified communications devices, and co-scheduling the two or more of the communications devices simultaneously using the one or more determined beams, wherein the number of determined beams is less than the number of communications devices.

The method provides a number of advantages. For instance, a network node, being e.g. a transmission point with analog beamforming, is enabled to more easily co-schedule multiple communications devices simultaneously. This in turn will increase the capacity as well as reduce the latency in the communications system.

The objective is according to an aspect achieved by a computer program for a scheduling device, the computer program comprising computer program code, which, when run on at processing circuitry of the network node causes the network node to perform the method as above.

The objective is according to an aspect achieved by a computer program product comprising a computer program as above and a computer readable means on which the computer program is stored.

The objective is according to an aspect achieved by a network node for scheduling communications devices in a communications system. The network node is arranged to serve a number of communications devices by using an analog beamformer. The network node is configured to: identify two or more of the communications devices as candidates for co-scheduling, determine complex antenna weights for one or more beams based on transmission beam reports received from each of the two or more identified communications devices, and co-schedule the two or more of the communications devices simultaneously using the one or more determined beams, wherein the number of determined beams is less than the number of communications devices.

Further features and advantages of the embodiments of the present teachings will become clear upon reading the following description and the accompanying drawings.

DETAILED DESCRIPTION

Figure 1:
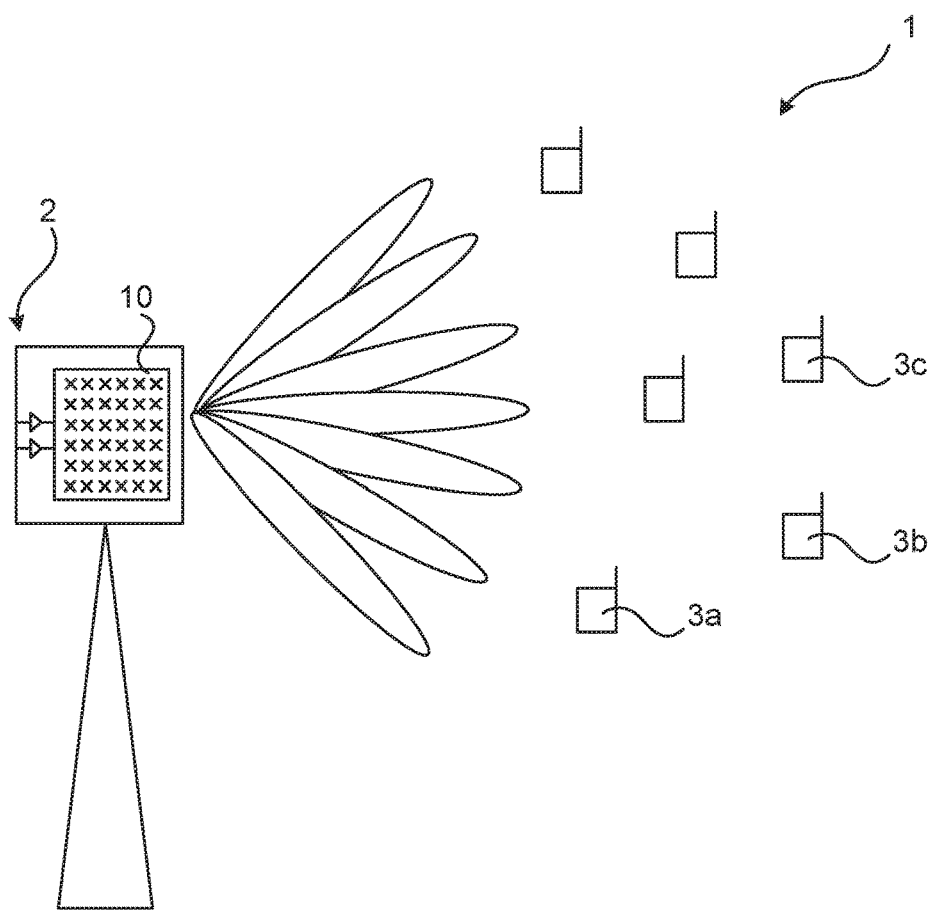
FIG. 1 illustrates a communications system in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates a communications system 1 in which embodiments according to the present teachings may be implemented. The communications system 1 comprises a wireless communications network implementing, for instance, a New Radio (NR) interface, and/or Long Term Evolution (LTE) interface. According to various embodiments, a Transmission Reception Point (TRP) 2 of the communications system 1 evaluates the possibility to co-schedule communications device 3a, 3b, 3c, for instance user equipment (UEs, used in the following as an example). The TRP 2 may, for instance, be a radio access point, a base station, an evolved nodeB (eNB) etc.

In this description the TRP 2 is also denoted network node 2. As an example of the evaluation on whether co-scheduling should be done, the TRP 2 may evaluate if any served UE would benefit from being co-scheduled with one or more other UEs. If so, the TRP 2 may analyze the reported best TRP 2 transmission (TX) beam for each of these identified UEs 3a, 3b, 3c based on previous beam management processes (beam management described below). If possible, the TRP 2 may then design a new beam for an analog beamformer with similar angular coverage as the combination of the best TRP TX beams for the identified UEs 3a, 3b, 3c. The TRP 2 then uses this new beam to serve the identified UEs 3a, 3b, 3c simultaneously, for instance by using frequency multiplexing or code multiplexing.

For the purposes of the present teachings, usable for e.g. 5G/NR, "Beam management" can be seen as comprising means and methods for handling situations in which beam-shaped radiation (narrow beams) is used. The beam management is important for controlling the beams such that many UEs located in different directions can be properly served. The beam management comprises, for instance, functionality such as:

Beam Determination, used for TRPs 2 or UE 3a, 3b, 3c to select of its own Tx/Rx beam Beam Measurement, used for TRPs 2 or UE 3a, 3b, 3c to measure characteristics of received beamformed signals Beam Reporting, used for UE 3a, 3b, 3c to report information on a property e.g. quality of a beamformed signal based on Beam Measurement Beam Sweeping, operation of covering a spatial area with beams transmitted and/or received during a time interval in a predefined way The beam management comprises, for instance, procedures such as:

P-1: Beam Selection for TRP Tx/UE Rx, used to enable UE measurement on different TRP Tx beams to support selection of TRP Tx beams/UE Rx beam.

P-2: Beam Reselection (Beam Change) for TRP Tx beam, used to enable UE measurement on different TRP Tx beams to possibly change inter/intra-TRP Tx beam.

P-3: Beam Reselection (Beam Change) for UE Rx beam, used to enable UE measurement on the same TRP Tx beam to change UE Rx beam in the case UE uses beamforming.

A "beam" is to be understood as a spatial filter configuration, i.e. a particular set of complex beamforming weights that generates a desired beam pattern when applied to the antenna panel. A beam may, for instance, have an antenna diagram with several peaks (see also FIG. 4).

Figure 2:
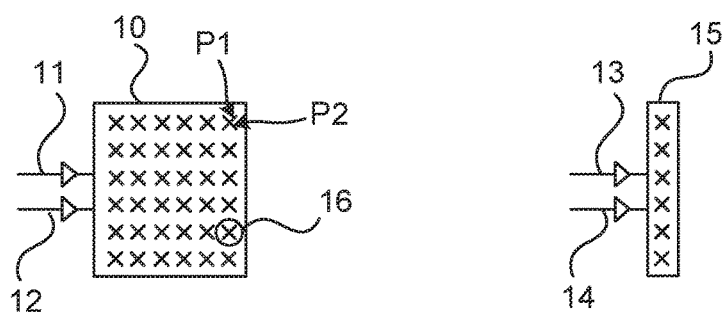
FIG. 2 illustrates antenna arrays.

FIG. 2 illustrates antenna panels (also denoted antenna arrays), and in particular two examples of dual-polarized analog antenna panels. To the left, a two-dimensional (planar) antenna panel 10 is shown and to the right a one-dimensional (linear) antenna panel 15 is shown. Each antenna panel 10, 15 comprises a number of radiating dual-polarized elements (one such element encircled and indicated at reference numeral 16), and each polarization P1, P2 is connected to a respective transmit/receive unit (TXRU) 11, 12; 13, 14. For the purposes of the present teachings, there is one TRXU 11, 12; 13, 14 per antenna panel and polarization (as opposed to cases where there may be one TRXU per antenna element and polarization). In the illustrated case, each antenna panel 10, 15 is connected to one TXRU 11, 12; 13, 14 per polarization.

Figure 3:
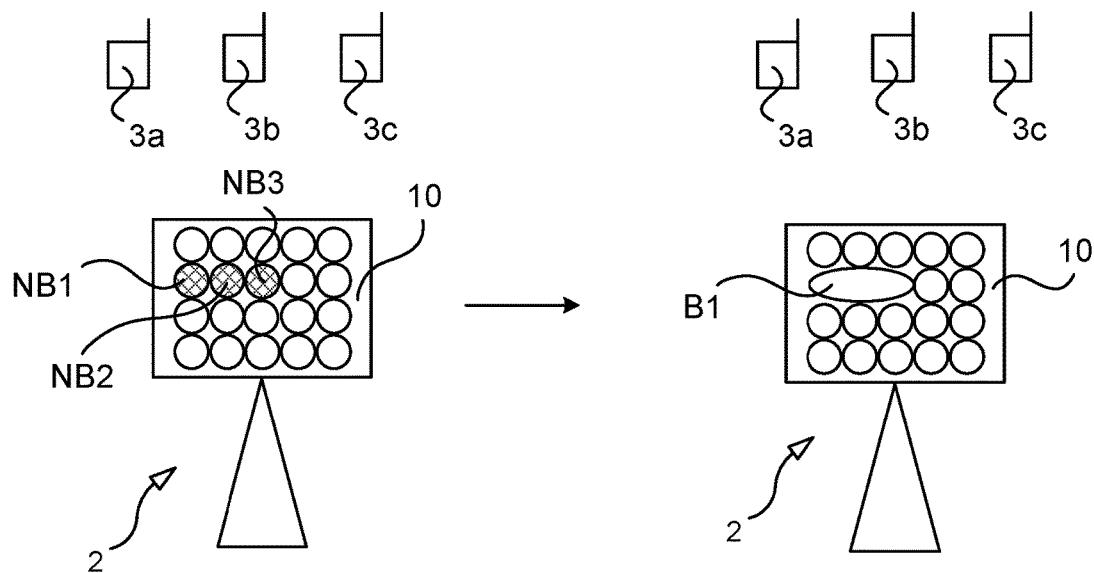
FIG. 3 illustrate particular embodiments according to the present teachings.

FIG. 3 illustrates embodiments according to the present teachings. The TRP 2 comprises an analog two-dimensional panel 10 with multiple narrow beams (illustrated as circles) in both elevation and azimuth dimension. The present teachings relate to analog beamformer implementations, and according to prior art only one TRP TX beam can then be used at each time instance. The illustrated three UEs 3a, 3b, 3c can therefore not be served simultaneously by a single narrow beam according to prior art. Instead, each of the UEs 3a, 3b, 3c would be served by a respective narrow beam NB1, NB2, NB3 in a time multiplexing manner as illustrated at the left-hand side of FIG. 3. However, according to the present teachings, the TRP 2 identifies three UEs 3a, 3b, 3c that would benefit from co-scheduling, and creates one (or two) new wide analog beam(s) B1 (illustrated at right-hand side of FIG. 3) with a coverage approximately equal to the coverage of the previous three narrow beams NB1, NB2, NB3. The TRP 2 can now use this new wider beam B1 to co-schedule the three UEs UE1, UE2, UE3 simultaneously. Such co-scheduling may, for instance, be implemented by using frequency multiplexing. In other embodiments, the co-scheduling may be implemented by using code multiplexing.

In order to generate the new beam B1, proper phase and/or amplitude settings, defined by complex antenna weights, are needed for the antenna elements in the antenna panel 10. These complex antenna weights can be derived in different ways, examples of which are given next.

A first rather simple way that will work quite well and be sufficient in many cases, is to add the complex antenna weights for all the narrow beams NB1, NB2, NB3 that are to be combined. For example, assuming that the three beams NB1, NB2, NB3 with complex antenna weights w1, w2 and w3, respectively, are to be combined. Then the new complex antenna weights w4 for the new beam B1 would be w4=w1+w2+w3. For most cases, the complex weights w4 of the new beam B1 will have slightly different amplitude for the different antenna elements within the antenna panel 10, which will reduce the power amplifier efficiency.

Another, more flexible, but also more advanced way to find the complex antenna weights of the new beam B1 is to use some kind of optimization tool, e.g. a software tool, that evaluates different phase settings and/or amplitude settings in order to achieve the desired new beam B1. These optimized complex antenna weights w1 that combine multiple narrow beams NB1, NB2, NB3 may be either pre-calculated or calculated during operation.

Yet another way to find the complex antenna weights w4 is to use dual-polarized beamforming, which is very flexible in generating different beams without losing much power amplifier efficiency. A dual-polarized beamforming scheme is known from publication WO2011/050866A1, wherein wide beams having a desired beamwidth and beam shape can be created using a large active antenna array. In this scheme, which can be applied for finding the complex antenna weights in embodiments of a herein disclosed method, the beam shape is often much wider than the minimum beamwidth that the antenna panel size offers. However, this is obtained at the cost of using both polarizations to form the beam, and the dual port antenna panel will then offer only a single port. That is, when performing dual-polarized beamforming for an analog array, only one of the two ports of the panel can be used since both ports are used to generate one beam for this dual-polarized beamforming. Whether to use single or dual-polarized beamforming may be a decision based on compromise between reduced power amplifier efficiency and reduced number of available ports.

In case it is difficult to generate one wide beam B1 that covers all the narrow beams NB1, NB2, NB3 that should be combined, it is possible to divide the narrow beams NB1, NB2, NB3 into two or more wider beams instead of one wide beam. This will reduce the number of UEs that can be simultaneously co-scheduled, but it is still an improvement compared to using only narrow beams as in prior art.

Figure 4:
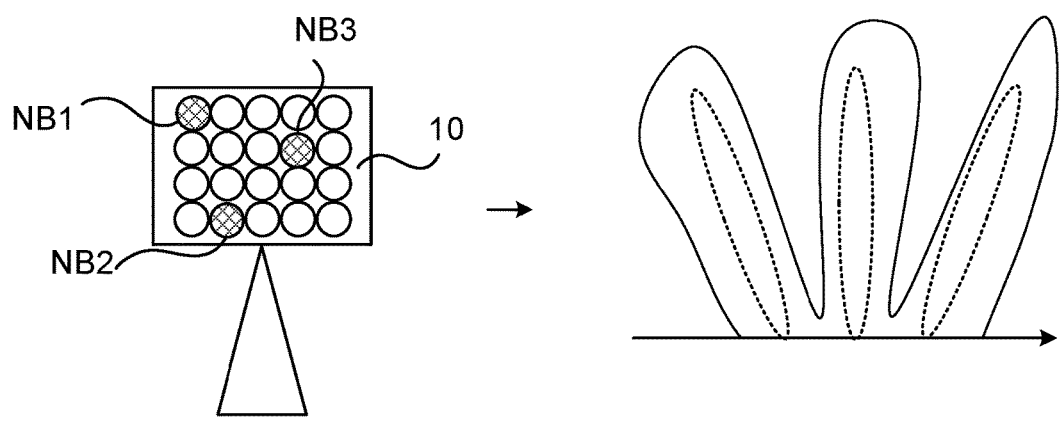
FIG. 4 illustrates embodiments according to the present teachings.

FIG. 4 illustrates embodiments according to the present teachings. It is noted that the narrow beams NB1, NB2, NB3 do not need to be adjacent. In some embodiments, illustrated in FIG. 4, three narrow beams NB1, NB2, NB3 are pointing in different directions using different and non-adjacent beams. The wide beam B1 replacing thee narrow beams NB1, NB2, NB3 (indicated by the dashed lines) may then have an antenna diagram having several peaks (indicated by the solid line) as illustrated at the right-hand side of FIG. 4. It is also noted that any number of UEs and beams may be involved, although only three are shown in the illustrated cases.

Figure 5:
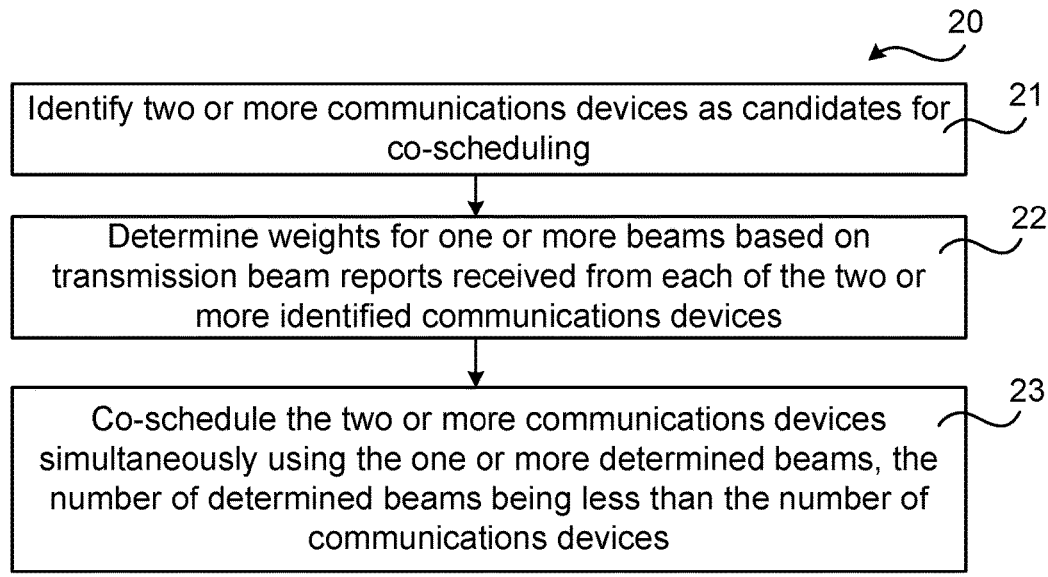
FIG. 5 illustrates a flow chart over steps of an embodiment of a method in a network node in accordance with the present teachings.

FIG. 5 illustrates a flow chart over steps of an embodiment of a method in a network node in accordance with the present teachings. Various embodiments of a method 20 in a network node 2 for implementing the co-scheduling are provided and described herein.

The TRP 2 may recognize that co-scheduling would be advantageous, e.g. by determining whether there are any serving UEs 3a, 3b, 3c that would benefit from co-scheduling. In a typical case UEs 3a, 3b, 3c with long data sessions and limited throughput would indeed benefit from being co-scheduled because these UEs 3a, 3b, 3c will need data for a long time, but at each time instant, they will not need the full bandwidth. Hence, two or more such UEs 3a, 3b, 3c can be scheduled simultaneously using, for instance, frequency multiplexing without their performance being deteriorated. The network node 2 may identify such UEs 3a, 3b, 3c for example by analyzing their applications (e.g. streaming, talking over phone etc.), or analyzing their buffer statuses, etc. The combining of narrow beams NB1, NB2, NB3 to a new wider beam B1 may lead to a drop in gain for the resulting wider beam B1 compared to the narrow beams NB1, NB2, NB3. However, as long as the throughput requirement per UE 3a, 3b, 3c is low this will not impact the performance (assuming the coverage requirement is still fulfilled).

The TRP 2 may analyze reports on TRP TX beam that it receives from respective identified UE 3a, 3b, 3c. The TRP 2 may, for instance, evaluate, based on the reports, if it is possible to create a new beam B1 for the analog beamformer having a similar angular coverage as the combination of these reported TRP TX beams.

The TRP 2 may then generate the new beam(s) B1 for the analog beamformer, e.g. according to the examples described earlier.

The TRP 2 may then use the new beam(s) B1 to co-schedule multiple UEs 3a, 3b, 3c for example by using frequency multiplexing.

In one embodiment, the UEs report their N best TRP TX beams. In this case it will be simpler to find a new analog beam that covers multiple UEs 3a, 3b, 3c by having the possibility of choosing from more beams than just the best beam per UE.

In one embodiment, in case the TRP has two antenna panels 10, it is possible to use dual-polarized beamforming, as noted earlier, to generate the wider beams B1, where one wide beam per antenna panel can be generated where the beams from the two antenna panels have orthogonal polarization in all directions (hence two panels are needed in order to get dual-polarized transmission).

In one embodiment, the TRP 2 may take into consideration the path gain for the identified UEs 3a, 3b, 3c, e.g. by using the RSRP values that are included in the TRP TX beam reports from the UEs 3a, 3b, 3c, and make sure that the new wider beam B1 does not reduce the antenna gain so much such that the UEs 3a, 3b, 3c lose coverage.

FIG. 5 illustrates a flow chart over steps of an embodiment of a method in a network node in accordance with the present teachings.

In a broadest embodiment, a method 20 of scheduling communications devices 3a, 3b, 3c in a communications system 1 is provided. The method 20 may be performed in a network node 2, such as, for instance, a radio access node as described e.g. with reference to FIG. 1. The network node 2 is arranged to serve a number of communications devices 3a, 3b, 3c by using an analog beamformer. For this purpose, the network node 2 may, for instance, be arranged to use a single analog beamformer per group of communications devices 3a, 3b, 3c to be co-scheduled. That is, a single analog beamformer is used to co-schedule multiple communications devices 3a, 3b, 3c in a group served by the single analog beamformer. In contrast to the prior art, wherein the analog beamformer would only serve one communications device 3a, 3b, 3c at each time instance, the herein disclosed method 20 enables several communications devices 3a, 3b, 3c to be served simultaneously by the single analog beamformer by using a broader beam.

The method 20 comprises identifying 21 two or more of the communications devices 3a, 3b, 3c as candidates for co-scheduling. As has been described earlier, the communications devices 3a, 3b, 3c may be identified as suitable for being co-scheduled in a number of different ways, e.g. based on the type of service that they have ongoing or that they request.

The method 20 comprises determining 22 complex antenna weights for one or more beams B1 based on transmission beam reports received from each of the two or more identified communications devices 3a, 3b, 3c. Different ways of such determining 22 have been described earlier. For instance, the complex antenna weights can be determined 22 by using a software tool for evaluating different phase settings and/or different amplitude settings and then selecting the complex antenna weights for a beam that best serves the communications devices 3a, 3b, 3c to be co-scheduled.

Phase and/or amplitude giving a beam with a coverage area covering all the respective coverage areas of the beams reported by the communications devices 3a, 3b, 3c may be considered a beam best serving these communications devices 3a, 3b, 3c.

The method 20 comprises co-scheduling 23 the two or more of the communications devices 3a, 3b, 3c simultaneously using the one or more determined beams B1, wherein the number of determined beams is less than the number of communications devices 3a, 3b, 3c. The co-scheduling 23 may, for instance, involve using frequency multiplexing or code multiplexing.

The method 20 provides a number of advantages. For instance, a network node (e.g. a transmission reception point) arranged for analog beamforming is enabled to co-schedule multiple communications devices simultaneously (by for example using frequency multiplexing). This will increase the capacity and reduce the latency in the communications system, in turn giving higher user satisfaction e.g. since the user may get the desired data faster.

In an embodiment, the identifying 21 comprises determining that the two or more of the communications devices 3a, 3b, 3c fulfils one or more of: having or requesting a service requiring data for a time duration longer than a threshold value $t_1$, requiring less than available bandwidth, and having a received power level above a threshold value $p_1$. As has been described, there are several ways of identifying the communications devices 3a, 3b, 3c that can be candidates for being co-scheduled. In a particular embodiment the communications device 3a, 3b, 3c has to fulfil all the above criteria:

It has or requests a service having a fairly long duration, i.e. requires communications resources for such time duration. These communications devices 3a, 3b, 3c benefits more from being co-scheduled owing to the reduced latency provided by the method 20 compared to communications devices requesting short-time services.

It has or requests a service that requires less than available by a single beam, i.e. less than what can be provided by a single beam using the full bandwidth of the communications system 1.

It has a received power level that is higher than a threshold value $p_1$. The threshold value $p_1$ should be set such that the reduced power that it receives when being co-scheduled with other communications devices 3a, 3b, 3c does not cause it to lose coverage (i.e. not "hear" the network node 2).

In other embodiments, the communications device 3a, 3b, 3c needs only fulfil one or two of these criteria. It is noted that there are further ways of identifying communications device 3a, 3b, 3c as candidates for being co-scheduled.

In various embodiments, the determining 22 comprises determining the complex antenna weights, based on the reports, such that the one or more beams B1 have an angular coverage covering at least parts of a combination of coverage areas of the respective transmission beams reported on by the identified communications devices 3a, 3b, 3c.

In a variation of the above embodiment, the method 20 comprises determining the complex antenna weights by one or more of:

summing beamforming weight vectors for reported transmission beams for each of the two or more identified communications devices 3a, 3b, 3c, evaluating one or both of different phase settings and amplitude settings and selecting complex antenna weights giving highest correspondence between the angular coverage of the one or more beams and the respective transmission beams reported on by the identified communications devices 3a, 3b, 3c, and using dual-polarized beamforming. This is, as mentioned earlier, a very flexible way for generating different beams while still having full power amplifier efficiency. This embodiment comes at the cost of only being able to use one of the two ports of the panel since both ports are used to generate one beam. As also described earlier, whether to use single or dual-polarized beamforming will be a compromise between reduced power amplifier efficiency and reduced number of available ports.

In various embodiments, the method 20 comprises receiving transmission beam reports from the two or more communications devices 3a, 3b, 3c, the transmission beam reports comprising reports on their respective N best transmission beams.

In various embodiments, the method 20 comprises, prior to the co-scheduling 23, determining that antenna gain reduction if using the one or more beams B1 is less than a threshold value, $g_1$, above which any of the identified communications devices 3a, 3b, 3c loses coverage.

In a variation of the above embodiment, the method 20 comprises removing any communications device 3a, 3b, 3c having an antenna gain reduction higher than the threshold value, $g_1$, from being co-scheduled 23.

In various embodiments, the co-scheduling 23 comprises using frequency multiplexing.

In various other embodiments, the co-scheduling 23 comprises using code multiplexing.

Figure 6:
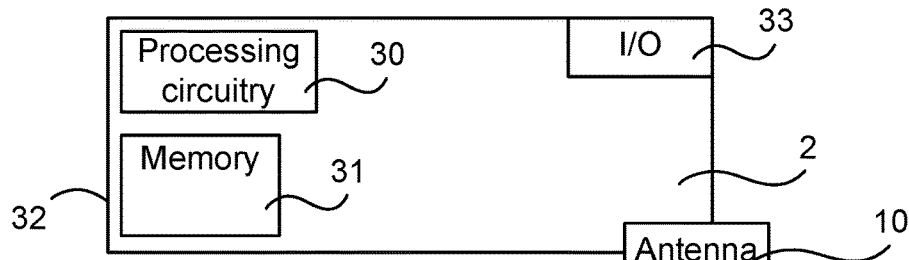
FIG. 6 illustrates a network node and means for implementing embodiments of the method in accordance with the present teachings.

FIG. 6 illustrates a network node and means for implementing embodiments of the method in accordance with the present teachings.

The network node 2 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the network node 2 to perform a set of operations, or steps, e.g. as described in relation to FIG. 5. For example, the storage medium 41 may store the set of operations, and the processing circuitry 40 may be configured to retrieve the set of operations from the storage medium 41 to cause the network node 2 to perform the set of operations. The set of operations may be provided as a set of executable instructions. The processing circuitry 30 is thereby arranged to execute methods as disclosed herein.

The storage medium 41 may also comprise persistent storage, which, for example, can be any single one or combination of magnetic memory, optical memory, solid state memory or even remotely mounted memory.

The network node 2 also comprises an input/output device 33 for communicating with other entities such as the communication devices 3a, 3b, 3c and other network nodes (not shown herein). The input/output device 33 may be an interface and may, for instance, comprise a protocol stack, for wireless communications with the communication devices 3a, 3b, 3c. The input/output device 33 may be used for receiving data input, e.g. requests from communications devices 3a, 3b, 3c, and for outputting data, e.g. transmitting data wirelessly. The input/output device 33 may comprise receiving circuitry and transmitting circuitry. The network node 2 also comprises or is connected to an antenna device 10 (e.g. as described with reference to FIGS. 1 and 2) and transmission/reception circuitry for wireless communication with the communications devices 3a, 3b, 3c.

A network node 2 for scheduling communications devices 3a, 3b, 3c in a communications system 1 is provided. The network node 2 is arranged to serve a number of communications devices 3a, 3b, 3c by using an analog beamformer. The network node is configured to:
  identify two or more of the communications devices 3a, 3b, 3c as candidates for co-scheduling,
  determine complex antenna weights for one or more beams B1 based on transmission beam reports received from each of the two or more identified communications devices 3a, 3b, 3c, and
  co-schedule the two or more of the communications devices 3a, 3b, 3c simultaneously using the one or more determined beams B1, wherein the number of determined beams is less than the number of communications devices 3a, 3b, 3c.

The network node 2 may be configured to perform the above steps, and implement any of the described embodiments of e.g. the method 20, e.g. by comprising one or more processors 30 (or processing circuitry) and memory 31, the memory 31 containing instructions executable by the processor 30, whereby the network node 2 is operative to perform the steps.

In an embodiment thus, a network node 2 is provided, for scheduling communications devices. The network node comprises one or more processors and memory, the memory containing instructions executable by the processor, whereby the network node is operative to: identify two or more of the communications devices as candidates for co-scheduling, determine complex antenna weights for one or more beams based on transmission beam reports received from each of the two or more identified communications devices, and co-schedule the two or more of the communications devices simultaneously using the one or more determined beams, wherein the number of determined beams is less than the number of communications devices.

In an embodiment, the network node 2 is configured to identify by determining that the two or more of the communications devices 3a, 3b, 3c fulfils one or more of: having or requesting a service requiring data for a time duration longer than a threshold value $t_1$, requiring less than available bandwidth, and having a received power level above a threshold value $p_1$.

In various embodiments, the network node 2 is configured to determine the complex antenna weights, based on the reports, such that the one or more beams B1 have an angular coverage covering at least parts of a combination of coverage areas of the respective transmission beams reported on by the identified communications devices 3a, 3b, 3c.

In various embodiments dependent on the above set of embodiments, the network node 2 is configured to determine the complex antenna weights by one or more of: summing beamforming weight vectors for reported transmission beams for each of the two or more identified communications devices 3a, 3b, 3c, evaluating one or both of different phase settings and amplitude settings and selecting complex antenna weights giving highest correspondence between the angular coverage of the one or more beams and the respective transmission beams reported on by the identified communications devices 3a, 3b, 3c, and using dual-polarized beamforming.

In various embodiments, the network node 2 is configured to receive transmission beam reports from the two or more communications devices 3a, 3b, 3c, the transmission beam reports comprising reports on their respective N best transmission beams.

In various embodiments, the network node 2 is configured to, prior to the co-scheduling, determine that antenna gain reduction if using the one or more beams B1 is less than a threshold value, $g_1$, above which any of the identified communications devices 3a, 3b, 3c loses coverage.

In various embodiments, the network node 2 is configured to remove any communications device 3a, 3b, 3c having an antenna gain reduction higher than the threshold value, $g_1$, from being co-scheduled 23.

In various embodiments, the network node 2 is configured to co-schedule by using frequency multiplexing.

In various embodiments, the network node 2 is configured to co-schedule by using code multiplexing.

Figure 7:
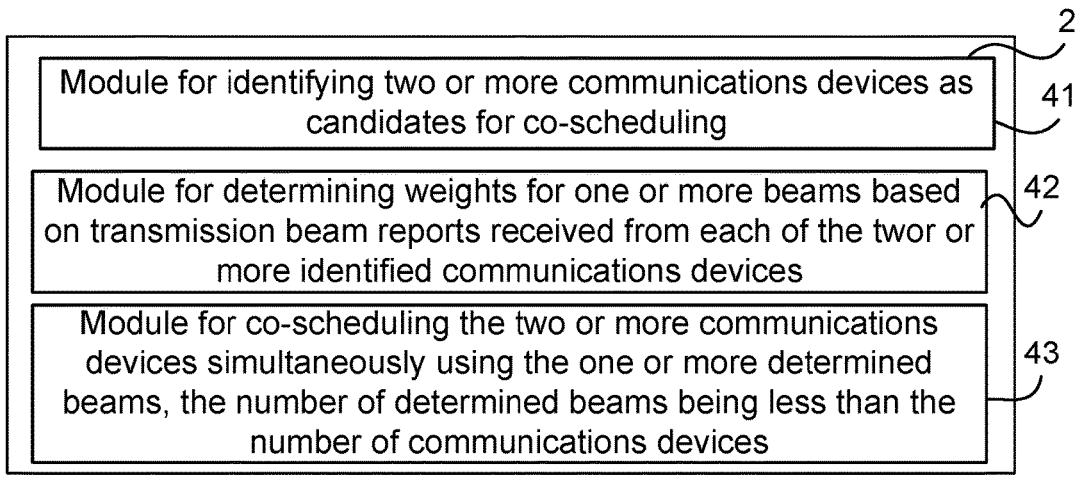
FIG. 7 illustrates a network node comprising function modules/software modules for implementing embodiments of the present teachings.

FIG. 7 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A network node for scheduling communications devices in a communications system is provided. The network node 2 is arranged to serve a number of communications devices 3a, 3b, 3c by using an analog beamformer. The network node comprises a first module 41 for identifying two or more of the communications devices as candidates for co-scheduling. Such first module 41 may, for instance, comprise processing circuitry adapted to perform such identifying.

The network node comprises a second module 42 for determining complex antenna weights for one or more beams based on transmission beam reports received from each of the two or more identified communications devices. Such second module 42 may, for instance, comprise processing circuitry adapted to perform such determination. The second module 42 may, for instance, take as input transmission beam report values received from the communications devices and use these in the determining.

The network node comprises a third module 43 for co-scheduling the two or more of the communications devices simultaneously using the one or more determined beams B1, wherein the number of determined beams is less than the number of communications devices. Such third module 43 may, for instance, comprise processing circuitry adapted for performing co-scheduling.

It is noted that one or more of the modules 41, 42 and 43 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of scheduling communications devices in a communications system, the method being performed in a network node arranged to serve a number of communications devices by using an analog beamformer, the method comprising:
   identifying a set of two or more of the communications devices as candidates for co-scheduling,
   determining complex antenna weights (W) for one or more beams based on beam reports received from each of the two or more identified communications devices, and
   co-scheduling the two or more of the communications devices simultaneously using the one or more determined beams, wherein the number of determined beams is less than the number of communications devices, wherein
   the set of two or more communication devices comprises a first communication device and a second communication device,
   the method further comprises:
   receiving a first beam report transmitted by the first communication device, the first beam report comprising a first transmit beam identifier associated with a first set of complex antenna weights (W1) that the network node used to transmit a first reference signal;
   using the first transmit beam identifier to obtain the first set of complex antenna weights;
   receiving a second beam report transmitted by the second communication device, the second beam report comprising a second transmit beam identifier associated with a second set of complex antenna weights (W2) that the network node used to transmit a second reference signal; and
   using the second transmit beam identifier to obtain the second set of complex antenna weights, and
   the step of determining the complex antenna weights (W) based on the beam reports received from each of the two or more identified communications devices comprises determining the complex antenna weights (W) based on W1 and W2 such that W is a function of W1 and W2.

2. The method of claim 1, wherein the identifying comprises determining that the two or more of the communications devices fulfils having or requesting a service requiring data for a time duration longer than a threshold value $t_1$.

3. The method of claim 1, wherein the determining comprises determining the complex antenna weights, based on the reports, such that the one or more beams have an angular coverage covering at least parts of a combination of coverage areas of the respective transmission beams reported on by the identified communications devices.

4. The method of claim 1, wherein determining the complex antenna weights comprises summing beamforming weight vectors for reported transmission beams for each of the two or more identified communications devices.

5. The method of claim 1, comprising receiving beam reports from the two or more communications devices, the beam reports comprising reports on their respective N best transmission beams, wherein N is a whole number greater than or equal to 1.

6. The method of claim 1, comprising: prior to the co-scheduling, determining that antenna gain reduction when using the one or more beams is less than a threshold value, $g_1$, above which any of the identified communications devices loses coverage.

7. The method of claim 6, comprising removing any communications device having an antenna gain reduction higher than the threshold value, $g_1$, from being co-scheduled.

8. The method of claim 1, wherein the co-scheduling comprises using frequency multiplexing.

9. The method of claim 1, wherein the co-scheduling comprises using code multiplexing.

10. The method of claim 1, wherein determining W comprises calculating aW1+bW2, wherein a=1 and b=1.

11. The method of claim 4, wherein determining the complex antenna weights further comprises:
   evaluating different phase settings and/or amplitude settings; and
   selecting complex antenna weights giving highest correspondence between the angular coverage of the one or more beams and the respective transmission beams reported on by the identified communications devices.

12. A computer program product comprising a non-transitory computer readable medium storing a computer program for a network node, the computer program comprising computer program code, which, when run on a processing circuitry of the network node causes the network node to perform the method of claim 1.

13. A network node for scheduling communications devices in a communications system, the network node being arranged to serve a number of communications devices by using an analog beamformer, the network node being configured to:
   identify a set of two or more of the communications devices as candidates for co-scheduling,
   determine complex antenna weights for one or more beams based on transmission beam reports received from each of the two or more identified communications devices, and
   co-schedule the two or more of the communications devices simultaneously using the one or more determined beams, wherein the number of determined beams is less than the number of communications devices, wherein
   the set of two or more communication devices comprises a first communication device and a second communication device,
   the network node is further configured to:
   obtain a first beam report transmitted by the first communication device, the first beam report comprising a first transmit beam identifier associated with a first set of complex antenna weights (W1) that the network node used to transmit a first reference signal;

use the first transmit beam identifier to obtain the first set of complex antenna weights;

obtain a second beam report transmitted by the second communication device, the second beam report comprising a second transmit beam identifier associated with a second set of complex antenna weights (W2) that the network node used to transmit a second reference signal; and use the second transmit beam identifier to obtain the second set of complex antenna weights, and the network node is configured to determine the complex antenna weights (W) based on the beam reports received from each of the two or more identified communications devices by determining the complex antenna weights (W) based on W1 and W2 such that W is a function of W1 and W2.

14. The network node as claimed in claim 13, configured to identify by determining that the two or more of the communications devices fulfils one or more of:

having or requesting a service requiring data for a time duration longer than a threshold value $t_1$, requiring less than available bandwidth, and having a received power level above a threshold value $P_1$.

15. The network node as claimed in claim 13, configured to determine the complex antenna weights, based on the reports, such that the one or more beams have an angular coverage covering at least parts of a combination of coverage areas of the respective transmission beams reported on by the identified communications devices.

16. The network node as claimed in claim 15, configured to determine the complex antenna weights by one or more of: summing beamforming weight vectors for reported transmission beams for each of the two or more identified communications devices, evaluating one or both of different phase settings and amplitude settings and selecting complex antenna weights giving highest correspondence between the angular coverage of the one or more beams and the respective transmission beams reported on by the identified communications devices, and using dual-polarized beamforming.

17. The network node as claimed in claim 13, configured to receive beam reports from the two or more communications devices, the beam reports comprising reports on their respective N best transmission beams, wherein N is a whole number greater than or equal to 1.

18. The network node as claimed in claim 13, configured to, prior to the co-scheduling, determine that antenna gain reduction when using the one or more beams is less than a threshold value, $g_1$, above which any of the identified communications devices loses coverage.

19. The network node as claimed in claim 18, configured to remove any communications device having an antenna gain reduction higher than the threshold value, $g_1$, from being co-scheduled.

20. The network node as claimed in claim 13, configured to co-schedule by using frequency multiplexing.

21. The network node as claimed in claim 13, configured to co-schedule by using code multiplexing.

22. The network node of claim 13, wherein the network node is configured to determining W by performing a calculation that comprises calculating W1+W2.

* * * * *